RICHARD TATSCH, INVENTOR.
Huebner, Beehler, Worrel & Herzig, Attorneys.

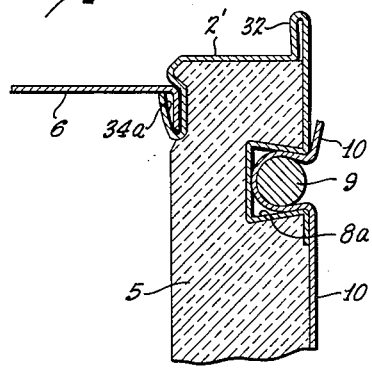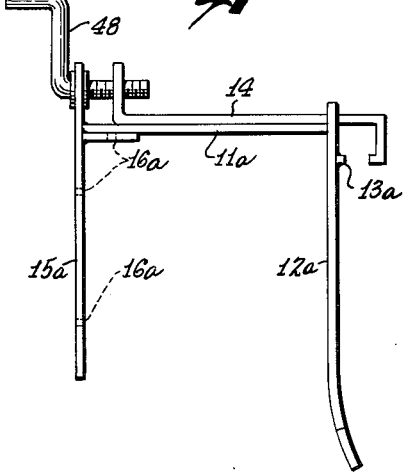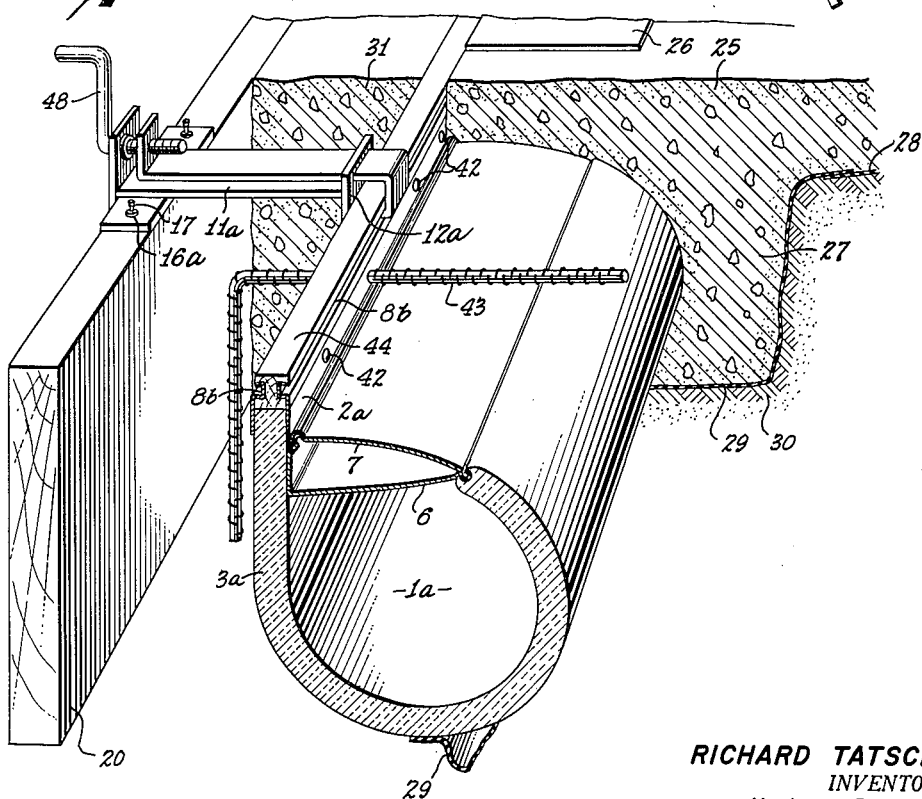

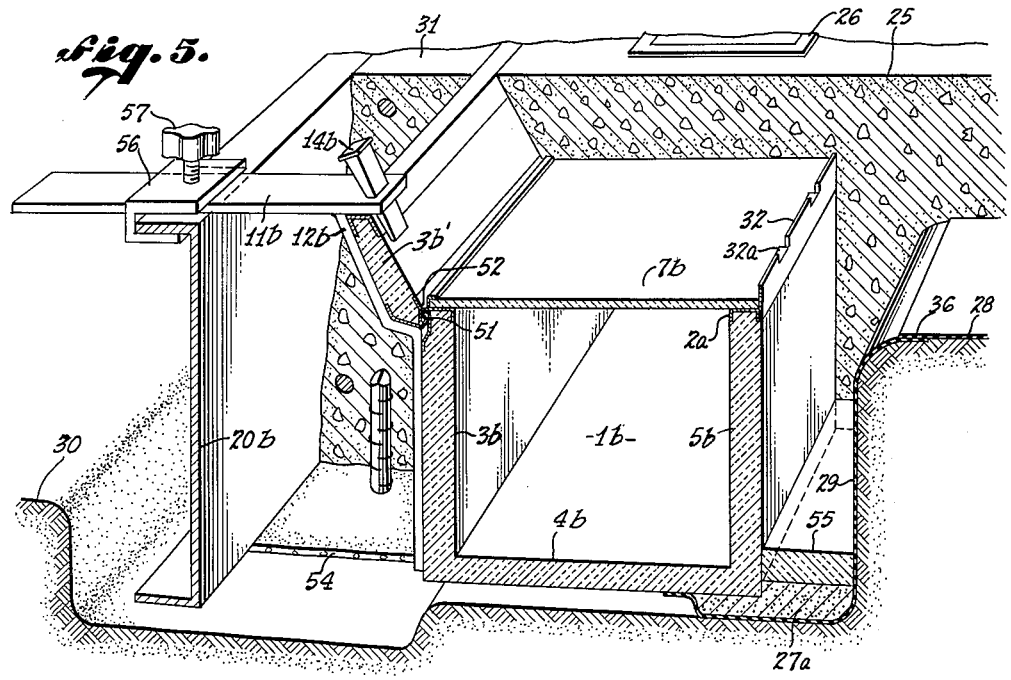
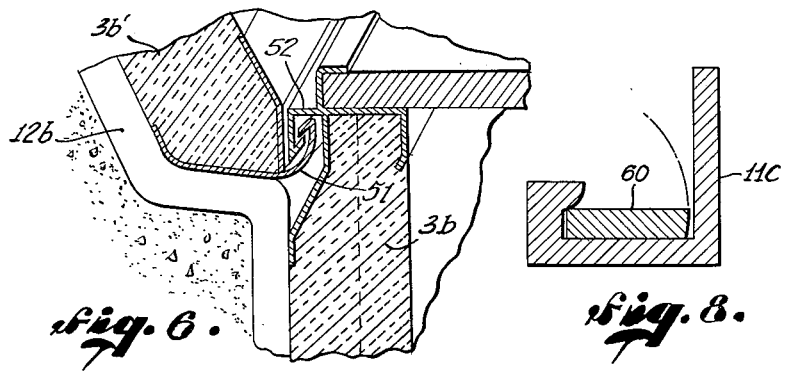

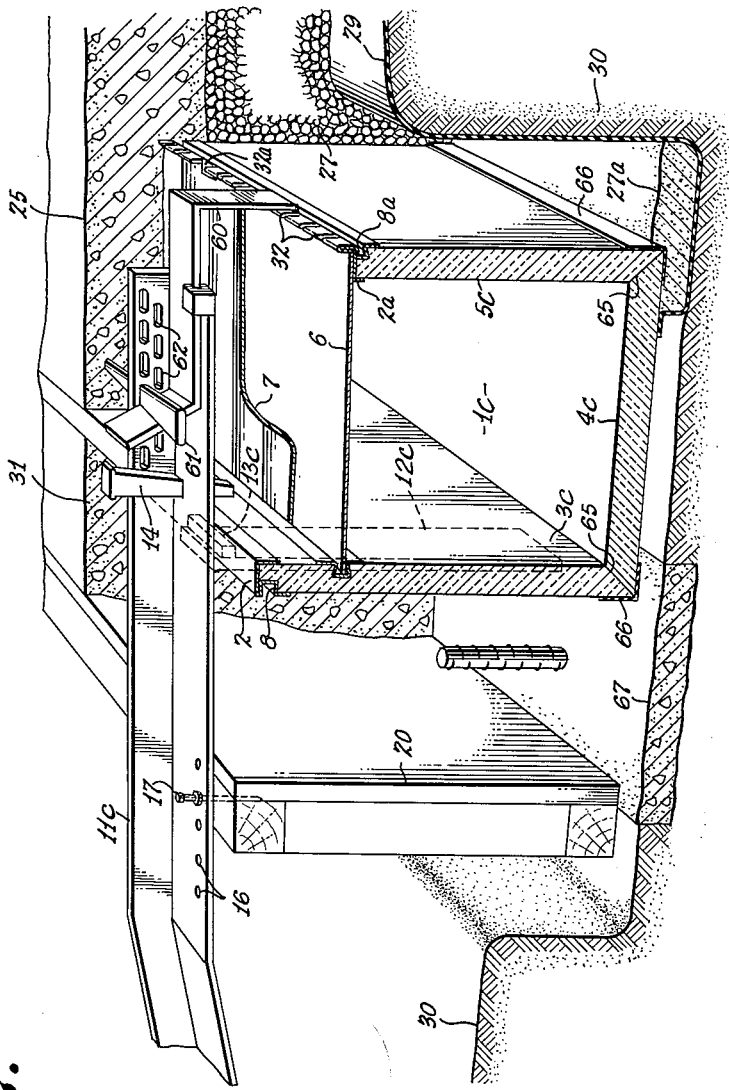

April 11, 1961
R. TATSCH
2,978,779
CONSTRUCTION AND INSTALLATION OF HEATING
CONDUITS OF BUILDINGS
Filed May 4, 1956
5 Sheets-Sheet 5
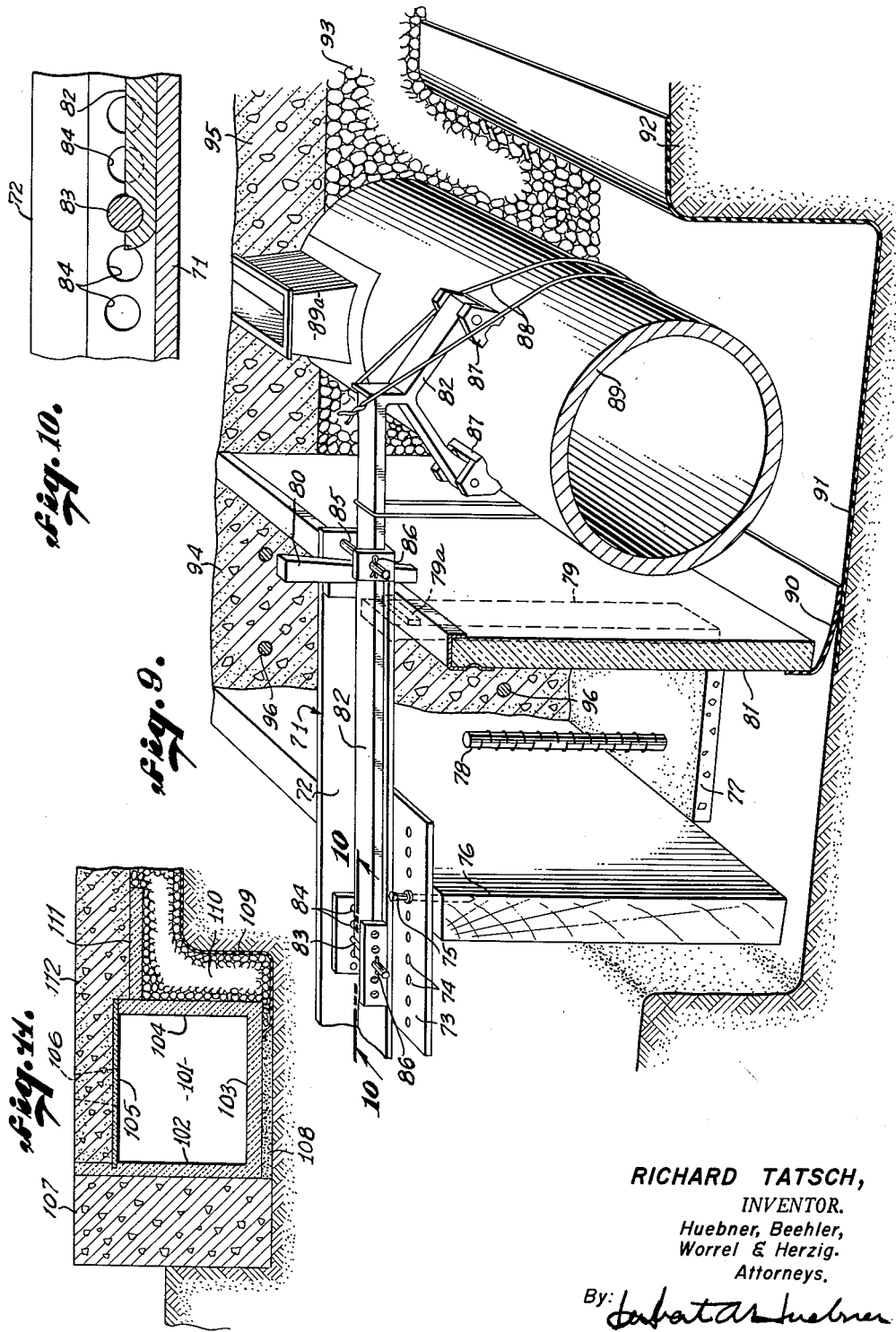
RICHARD TATSCH,
INVENTOR.
Huebner, Beehler,
Worrel & Herzig.
Attorneys.

United States Patent Office 2,978,779
Patented Apr. 11, 1961

2,978,779

CONSTRUCTION AND INSTALLATION OF HEATING CONDUITS OF BUILDINGS

Richard Tatsch, 901 W. 6th St., Silver City, N. Mex.

Filed May 4, 1956, Ser. No. 582,827

7 Claims. (Cl. 25—118)

This invention relates to the construction and installation of air conduits for heating and cooling in buildings, particularly to positioning such conduits while encasing them in concrete, and especially to such conduits comprising a thermal barrier as a wall portion thereof, such as is disclosed in my application Serial No. 524,224, filed July 25, 1955.

Conduits of this type are installed in masonry structures such as floors, walls or ceilings. When positioned below concrete floors, they are partially or completely surrounded by concrete, or concrete and particulate matter. The conduits so installed are used to distribute heating or cooling air in systems known in the building industry as "loop systems" or "perimeter loop," with or without radial feeder conduits.

Typical prior practice in the installation of such heating conduits has been to apply a thermal barrier in sheet or board form to the inner surface of a previously-poured foundation wall. The soil inside the foundation wall was then covered with a layer of gravel and a horizontal thermal barrier strip placed on the gravel adjacent the upright thermal barrier attached to the wall. Then the gravel and thermal barriers would be covered with a moisture barrier of suitable sheet material. Next the perimeter air conduits would be assembled and suitably supported above the moisture barrier and adjacent the thermal barrier strips on the inner side of the wall. Finally, a concrete floor slab was poured so as to encase the conduit and with its top surface even with the top of the foundation wall. This procedure is unduly costly in time and labor since the concrete workers and equipment are brought on the job, first to construct the foundation wall and again, at a latter time, to pour the floor slab. Also, it has been difficult during the pouring of the floor slab to prevent the liquid concrete from floating the conduits out of their proper positions.

One of the objects of my invention is to effect the pouring of a building foundation wall and floor slab and the encasement of a perimeter air heating or cooling conduit beneath the floor with reduced expenditure of time and labor by the use of improved apparatus comprising outside wall formwork, a unitary structure which combines the functions of an air conduit, a perimeter thermal barrier, an inside wall formwork and a wall-floor expansion joint, and reusable positioning means by which the unitary combined-function structure can be effectively supported from the outside formwork.

Another object of the invention is to provide a type of reusable positioning means such as is referred to above which is adaptable to various forms and sizes of air conduit structures.

A further object of the invention is to provide a unitary multiple function conduit structure such as is referred to above, in which the conduit outer side wall thereof is formed in two sections, one of which can be omitted to permit use of the structure as a radial or feeder conduit instead of as a perimeter conduit.

Another object of my invention is to provide a new and useful reusable positioning and securing apparatus and means to secure in relation to a single foundation formwork, ordinary perimeter insulation, in board form, and a separate ordinary conduit, which are encased in concrete, and or concrete and particulate matter, resulting in a foundation wall separated from the encased conduit by perimeter insulation.

In a preferred form of my invention, which comprises in combination walls which function as perimeter insulation, and conduit, and foundation wall formwork, these parts are constructed of material or materials having the following general characteristics. The materials should not be subject to decomposition from rot, termites, or heat that will be encountered by underfloor conduits. The material should have a low thermal conductivity. Inherently, or by protective coating, the material must in use resist impairment from moisture and vapor which may be present. The material should possess sufficient structural stability, or be reinforced, to resist normal construction impact, or external pressures. The exposed inner surfaces of the conduit should resist erosion from air movement and preferably should be smooth so as not to resist air movement.

This conduit wall material may be made of compressed and molded glass fibers bonded with phenolic resin and heat cured. It can be made of this same material in manufactured board form. In addition thereto an inside lining or skin of aluminum foil is useful to eliminate erosion, function as a moisture and vapor barrier during a heating cycle, minimize skin resistance to air movement, and serve as reflective insulation. An outer skin consisting of a bituminous coating, reinforcing fibers of woven glass, or of sisal, and asphalt impregnated and coated kraft paper or papers, for example, gives additional structural stability, and serves as an impermeable moisture and vapor barrier.

The conduit material may be molded and have imbeded in it steel ribs which can terminate in or connect to metal binders or fastening apparatus. This gives added structural stability. In a like manner the material in board form may be grooved to encompass a ribbed framework, or be grooved and be encompassed by a ribbed framework which terminates in or is secured to metal end bindings. An impermeable membrance or skin may be applied to the resulting structure to cover the board and the ribs. The longitudinal sides, the longitudinal corners, and the abutting ends may be metal reinforced for added strength and durability.

Plastics such as polyesters and glass fibers may be used. A polyurethane plastic also may be used. An expanded polystyrene bead has several desirable qualities and may be satisfactory. Various organic fibrous materials are available and may be used after treatment thereof to resist rot, termites and the like and protection to withstand deterioration by moisture or vapor. Depending upon their characteristics, some materials may be used without skins or protective coatings whereas others can be sandwiched between skins and protective coating, structural frameworks, etc. Any of the materials used can be utilized in conjunction with heat transmitting panels.

When the separate perimeter insulation and separate conduit means are used, the insulation may be any material which is acceptable for use as perimeter insulation made in board form, such as, an expanded polystyrene bead, a Fiberglas board, or organic fibers which are treated and impregnated. The conduit itself may be constructed of asbestos transite, glazed ceramic tile, cement tile, fiber conduits, sheet metal, or plastic materials which have been molded, extruded, or otherwise formed into conduits having suitable characteristics for the purpose.

The fibrous and cellular materials which have been referred to as suitable for thermal insulation and conduit use are also compressible to a substantial extent under heavy pressure and thus suitable as an expansion joint filler.

A more detailed description of specific embodiments of the invention as applied to underfloor air conduit installations is given with reference to the drawings, wherein:

Fig. 2 is an enlarged sectional view of a portion of the structure shown in Fig. 1;

Fig. 3 is an enlarged side elevation of the positioning means which is shown in use in Fig. 4;

Fig. 4 is a view generally similar to Fig. 1 but showing a different embodiment of the invention;

Fig. 5 is a view generally similar to that of Fig. 1 showing another embodiment of the invention;

Fig. 6 is an enlarged fragmentary detail of the conduit structure shown in Fig. 5;

Fig. 7 is another view generally similar to that of Fig. 1 showing still another embodiment of the invention;

Fig. 8 is an enlarged fragmentary sectional view of a detail feature of the positioning means shown in Fig. 7;

Fig. 9 is a view generally similar to that of Fig. 1 but showing improved positioning means constructed to hold conventional separate peripheral insulation and conduit means in spaced relation to each other and to outside foundation wall formwork;

Fig. 10 is an enlarged fragmentary section taken on the line 10—10 of Fig. 9, showing details of a portion of the positioning means;

Fig. 11 is a cross-sectional view showing a multiple function conduit structure as placed and secured against the inner side of an existing foundation wall and covered by a later-poured floor slab.

Figure 1:
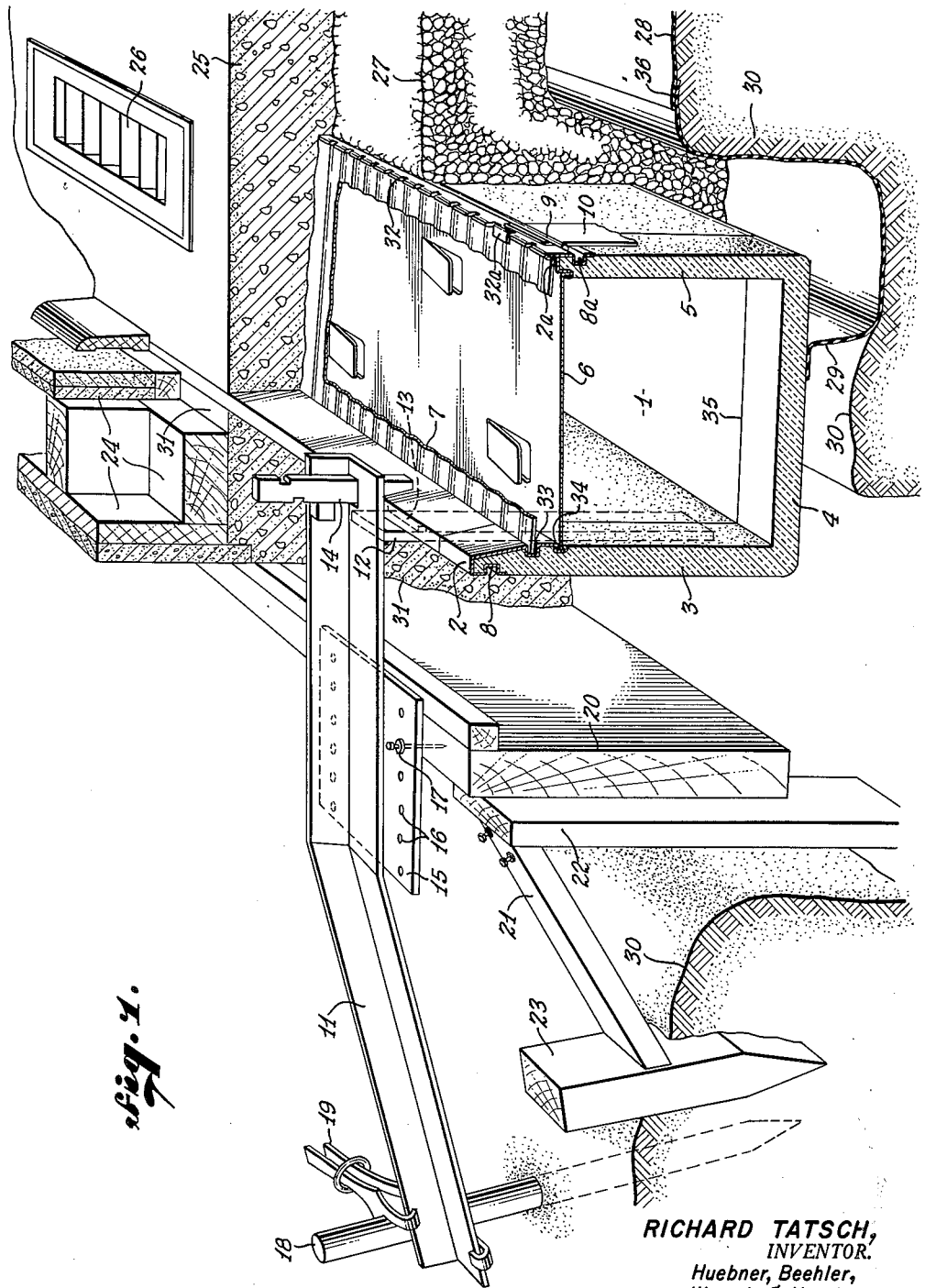
Fig. 1 is a fragmentary perspective view, partly in section, showing a multiple function conduit structure, a workform structure and positioning means therefor, together with foundation wall and floor slab, all in accordance with the present invention.

In Figure 1 reference numeral 1 designates generally a combination conduit structure wherein wall 3 functions as perimeter insulation, expansion joint filler foundation formwork, and a conduit wall, wall 4 functions as perimeter insulation and a conduit wall, and wall 5 functions primarily as an insulation conduit wall. Walls 6 and 7 are heat transmitting panels. Numerals 2 and 2' designate longitudinally bent metal facing strips or bindings which provide engaging means for component parts and add structural stability to walls 3 and 5 which they partially encompass. Numerals 8 and 8a designate slots in 2 and 2'.

Numeral 9 indicates an aligning metal wedge with a dual function. Namely, to hold abutting conduit structures in alignment while components are being assembled, and to pull taut and then secure a pressure sensitive tape 10. The function of tape 10 is to cover, seal, bind, and further align abutting conduit structure sections.

Numeral 11 indicates a horizontal, elongated member constituting the main arm of positioning means for the conduit structure. An elongated brace arm 12 rigidly connected (as by welding) to member 11 extends downward from the latter in position to engage the lower part of the outer wall 3 of conduit 1 and brace the conduit against outward movement. A lug device 13 on bracearm 12 prevents an upward or downward slipping of the conduit structure, after it has been engaged by slot 8. A wedge lock 14 slides through an opening in arm 11 and wedges wall 3 against arm 12.

A plate 15, rigidly attached to arm 11, has two series of holes 16 to receive nails driven into foundation wall formwork 20, thus providing adjustment for variable wall spacing between conduit 1 and formwork 20, according to the thickness of the foundation wall desired. A metal stake 18 driven into the ground 30 serves as an anchor to which arm 11 is secured by clamp 19.

The single exterior foundation wall formwork 20, in conjunction with conduit wall 3, retains concrete after placement for forming foundation wall 31 until it has hardened.

Formwork 20 is rigidly supported from the ground by means such as stake 22 which has its upper end braced exteriorly by stake 23 and brace 21.

Numeral 24 indicates a building wall of ordinary frame construction. A concrete floor is indicated at 25 and 26 represents a floor type air register which is in communication with conduit 1. At 27 is indicated partial conduit supporting and encasing particulate material which may be stone, gravel, etc. A moisture and vapor membrane 28 is shown which separates gravel 27 from ground 30. Numeral 29 represents a membrance which is attached to structure wall 4 and is cemented to membrane 28 at 36.

A series of metal tabs 32 are formed as a part of metal binding 2' (Figs. 1 and 2). At 32a is indicated a field folded tab 32 which secures corrugated steel structural heat panel 7. Numeral 33 indicates a continuous slot in metal binding 2 whose function is to support one edge of panel 7. Grooves 34 and 34a engage opposite edges of heat panel 6, as shown. Numeral 35 indicates the joint between abutting conduit structure walls.

The recommended procedure to follow in making the installation shown in Figure 1 is to do the earth trenching, then accurately install and brace formwork 20. Conduit corner structures may be mitred or coped, preferably at the time of manufacture. Then start at any corner and position and secure two re-usable brace arm devices (11) so that these will engage the conduit structure near each end. Position and clamp a corner structure. Install another positioning device so that the following conduit structure will be engaged near the end farthest from the first placed structure.

Position and secure a second similar conduit structure and align abutting ends with wedges 9. The tape 10 can be installed at this time or it can be installed after all the other components have been assembled. The wedges 9 may be removed, the tape positioned, and the wedges replaced. If conduit cutting is necessary, cut next to corner structures. Install a suitable distribution plenum fitting (not shown), air outlets 26 and plates 6 and 7.

Next proceed by placing particulate matter 27, making certain it is carefully pushed under conduit bottom wall 4. The placing of this particulate matter will force the conduit structure against bracearm 12. Pour the foundation wall 31 and follow by pouring floor 25. If desired, the positioning device may be removed after pouring wall 31. Particulate matter 27 will resist the thrust of concrete 31 against conduit wall 3. As a matter of precaution the positioning device can remain in position until after floor 25 is placed, but should be removed before the concrete in wall 31 becomes too hard. Where lengthy conduit structures are being installed, numerous positioning devices may be required per unit.

In the construction shown in Figs. 3 and 4 the air conduit and the positioning means are modified in form. That is, the air conduit 1a of thermal insulating material has bottom and inner walls 4a, 5a of cylindrical form while the outer side 3a extends tangentially upward in flat form to a level above the levels of the metal top walls 6a and 7a which are formed from a longitudinally folded sheet and perform the functions of walls 6 and 7 of the Fig. 1 form of construction.

The upper edge of conduit wall 3a is fitted with metal binding strips 2a which are apertured, as at 42, to receive reinforcing rods 43 to be embedded in the concrete of floor 25 and wall 31. Strips 2a engage longitudinal slots 44a of wood strip 44 which constitutes a part of wall 3a and extends it upward to floor level. The strip 44 may have sliding engagement wtih strips 2a and be positioned to engage the strips 2a of two adjacent conduit sections in mutually bracing fashion.

The positioning means shown in Figs. 3 and 4 comprising a horizontal elongated member 11a fitted with a slide 14a and with rigidly attached braces 12a and 15a. The latter has nail or screw holes 16a providing for rigid attachment of brace 15a to the outside formwork 20a for foundation wall 31. Brace 12a is shaped to engage wall 3a of conduit 1a and carries a lug 13a. This lug and the adjacent outwardly turned end of slide 14a engage slots 44a of strip 44 when slide 14a is actuated by the crank-screw device 48. With the positioning means rigidly connected to formwork 20a and conduit structure 1a the latter is rigidly supported in spaced relation to formwork 20a, which in turn may be rigidly supported from the ground by suitable means such as at 21, 22, 23 in Fig. 1.

As in the case of the Fig. 1 construction, after the pouring of the foundation wall and floor slab and while the concrete is still somewhat plastic, the positioning means of Fig. 4 can be removed for reuse by first disengaging slide 14a from slot 8b by turning crank 48 and then forcing the structure 11a, 12a, 15a outward far enough to disengage lug 13a from conduit 1a whereupon the entire positioning means can be withdrawn upward.

In the construction shown in Figs. 5 and 6, additional modifications are shown in the combined conduit structure, the outside formwork and the positioning means. The numeral 1b designates a multiple part conduit structure comprising wall portions 3b, 4b, and 5b integrally formed of thermal insulation material, and a portion 3b', separately formed of similar insulation material and constituting an upward extension of wall portion 3b, the tops of wall parts 3b and 5b being of the same height and joined by metal top wall 7b. Wall parts 3b'' and 3b are fitted with resilient connecting means 51 and 52 (Fig. 6) which serve to support part 3b' in its upwardly and laterally inclined position.

The outside formwork 20b for the foundation wall is in the form of a steel channel which is supported on concrete spot footings or piers 54. The positioning means in this embodiment comprises transverse elongated member 11b which is adjustably secured to formwork 20b by clamp parts 56 and 57. Welded to arm 11b is a brace arm 12b shaped to conform to the outer wall parts 3b and 3b' of the conduit structure 1b and give it strong support, a wedge 14b serving to lock the conduit structure and positioning means firmly together.

A bed of sand or mortar 27a provides support for the inner side of the conduit structure. The additional strip of thermal insulation 55 may be used to supplement the insulation afforded by the conduit structure.

As in the cases of the previously described constructions, the successive pouring of wall 31 and floor 25 effectively encases the conduit structure. By providing reinforcing rods (as shown) for wall 31, the latter becomes in effect a reinforced beam structure supported on piers 54.

A primary advantage of forming wall section 3b' separately from wall 3b is that, by omitting section 3b' the remainder of the conduit structure is available for use as a "radial" conduit when provision for radial distribution of air is desired.

The construction shown in Fig. 7 represents another embodiment of the invention generally similar to that of Fig. 1, but with modifications of the air conduit structure and the positioning means. Thus the conduit structure 1c has its walls 3c, 4c and 5c of heat insulating material separately formed with their joints mitred at 65, 65 and connected by tapes 66, 66. Other parts of the conduit structure are substantially like corresponding parts of the conduit structure of Fig. 1 and are accordingly designated by the reference numerals used in Fig. 1 without further description. The multiple wall structure of the Fig. 7 conduit is less rigid than the one-piece structure of Fig. 1 but compensation for this is found in better support provided by the form of positioning means shown in Fig. 7.

Thus the transverse elongated member 11c of the positioning means, while adapted to be ground anchored and attached to outside formwork 20 as in Fig. 1, is extended in length to over-lie the conduit structure 1c and afford direct support to both its inner and outer sides. Thus, while conduit wall 3c is clamped against the rigid parts 12c and 13c of the positioning means, the latter is also fitted with a slide 60 which has a depending part to engage slot 8a of wall 5c and is adjustably secured by wedge 61 in conjunction with holes 62. The adjustability of slide 60 adapts the positioning means for use with conduits of different size. The structural detail of Fig. 8 indicates how slide 60 can be turned about a longitudinal axis to operatively assemble it on arm 11c.

Numeral 27a designates mortar or sand placed to give support to the conduit structure. An earlier placed partially completed foundation wall is shown at 67. The remaining foundation wall to be poured is shown at 31. Gravel or other particulate matter 27 helps to force the conduit structure outward against arm 12c, and, after matter 27 has been placed, slide 60 can be removed before pouring wall 31 and floor 25.

Fig. 9 shows a modified form of the formwork and conduit positioning means designed for use with separately formed peripheral heat insulation and conduit means. The positioning means, generally designated by numeral 71, comprises an elongated member 72 which may be anchored at one end to the ground by a stake (not shown) as in Fig. 1. Rigidly attached to arm 72 is a plate 73 having a series of holes 74 to receive nails 75 to secure arm 72 to an outside foundation wall formwork 76 supported firmly on concrete piers, one of which is shown at 77 with dowel pin 78. A depending brace arm 79 is rigidly attached, as by welding, to the inner end part of arm 72. A wedge 80 extending through an aperture in arm 72 serves to clamp a flat thermal insulation member 81 firmly against arm 79 in position to serve as inside formwork for the pouring of the foundation wall to be placed. A lug 79a carried by arm 79 engages a groove in the outer side of top binding strip 81a of member 81 so that the latter is effectively supported by the positioning means 71.

On the arm 72 is mounted an elongated slide 82 which can be held in different positions of longitudinal adjustment by bolt 83 which engages a transverse groove in the slide (Fig. 10) and can be entered in any one of several sets of holes 84 in arm 72. The other end of slide 82 is held in operative engagement with arm 72 by bolt 85. Cotter pins 86, 86 prevent displacement of bolts 83 and 85.

The forked inner end of slide 72 is fitted with pivoted dogs 87 and a wire harness 88 which serve to engage and fixedly support an air conduit 89 of conventional cylindrical form. By longitudinal adjustment of slide 82 air conduit 89 can be suitably positioned to bring its outlets, such as 89a, into alignment with registers or ducts in the floor or wall parts of the building structure.

In the use of the positioning means 71 in the manner contemplated in Fig. 9, it may first be attached to the top edge of ground-supported outside formwork 76 in such adjusted position as will produce a foundation wall of desired thickness. The outer end of means 71 is then firmly anchored to the ground. A strip 90 of moisture barrier material having been cemented to thermal barrier 81, the latter is next attached to positioning means 71 by means of wedge 80 in position to serve as inside formwork for the foundation wall. Next a moisture barrier sheet 91 may be cemented to strip 90 and extended over soil 92. Finally, slide 82 of the positioning means having been adjusted to properly position air conduit 89, the latter is attached to the positioning means by wire loops of harness 88, temporary supporting blocks for the conduit being used if desired to facilitate such attachment. The formwork structures and air conduit having been established in their proper relative positions, the next step is to partially encase the conduit in concrete or particulate matter such as gravel 93. The mass of this matter affords direct support to conduit 89 and thermal insulator 81 and, through the positioning means 71 helps to stabilize outside formwork 76.

Following the placement of gravel 93, the pouring of foundation wall 94 and floor 95 follow in succession. Reinforcement rods 96 are provided for wall 94 as it is supported on spaced piers 77.

Fig. 11 presents a simplified form and application of the combined air conduit, thermal barrier and expansion joint structure and shows how its benefits can be realized to a substantial degree even when used in connection with a previously constructed foundation wall. In Fig. 11, the perimeter air conduit 101 has outer side wall 102, bottom wall 103 and inner side wall 104 integrally formed of thermal insulation material, the wall 102 extending upward to floor level. Top wall 105 is made of heat-conducting material and fitted with air outlet 106. The conduit structure is installed against the inner side of previously poured concrete wall 107 to which it can be secured by nailing or cementing. It is additionally supported by a bed of sand 108. A moisture barrier 109 is provided and, after filling particulate matter 110 against wall 104 and placing an additional insulating strip 111, floor 112 can be poured to complete encasement of the conduit structure, as shown in Fig. 11.

It will be seen from the foregoing description, first, that my improved positioning means for installation of heating and cooling conduits has not only the economies of repeated use but also wide adaptability to different forms of conduit construction including the improved multiple part form of combined conduit and thermal barrier unit shown in Fig. 5 as well as the simple conduit structure of Fig. 9; and, second, that in all applications of the positioning means its rigid metal construction insures the correct positioning of the conduit and its air outlets in relation to the foundation wall and consequently to the air registers and conduits of the building to be supported by the wall.

Reference has already been made to the alternative conduit uses made possible by the multiple part construction of the combined conduit and thermal barrier structure shown in Fig. 5. This combined structure is not claimed herein broadly because it is claimed in its broader aspects in my earlier-filed application Serial No. 524,224.

The various embodiments herein disclosed of the improvements constituting my invention are not to be construed in a limiting sense since my invention embraces all equivalent structures within the scope of the following claims:

Having described my invention, what I claim as new and desire to secure by Letters Patent is:

1. Equipment for pouring concrete to form a floor slab and a circumscribing foundation wall of a building and simultaneously install a perimeter under-floor air conduit, the said equipment comprising an outside foundation wall formwork defining the upright outer surface of the foundation wall to be poured and comprising ground-engaging means for supporting it fixedly with the upper edge of its wall-defining surface at substantially the level of the floor surface of the slab to be poured; a combined air conduit and perimeter insulation structure having mutually-connected outside, inside, top and bottom wall portions with its outside wall projecting upward to a level substantially higher than its top wall and having good thermal insulating properties, the conduit being disposed parallel to the outside formwork with its outside wall spaced inward therefrom a distance equal to the thickness of the foundation wall to be poured and with the top of its outside wall at the floor level of the slab to be poured; and conduit-supporting means comprising a rigid structure extending across the top of the outside formwork and the intervening space between the formwork and the conduit and further comprising means for disengageably connecting said rigid structure to the formwork and means for disengageably connecting said rigid structure to the conduit structure, the conduit supporting means when operatively connected to the outside formwork and to the conduit structure serving to fixedly support the latter from the outside formwork and in the stated relation to it; whereby the conduit structure, spaced inwardly from the outside formwork as specified, is adapted to serve, when the foundation wall and floor slab are poured, as formwork for the inner side of the foundation wall and permanently thereafter as perimeter air conduit and as perimeter insulation between the conduit interior and the foundation wall and between the periphery of the floor slab and the foundation wall.

2. Equipment as claimed in claim 1 in which the rigid structure of the conduit-supporting means comprises a brace disposed to extend downwardly along the outside surface of the outside wall of the conduit and in contact with the lower part of said wall and in which one of the disengageable connecting means of the conduit-supporting means is disposed to engage the inside surface of the upwardly projecting part of the outside wall of the conduit and hold the conduit fixedly against the brace and in the specified position in relation to the outside formwork.

3. Equipment as claimed in claim 2 in which the conduit-supporting means has a downwardly facing surface and an upwardly-facing surface and the outside wall of the conduit has an upwardly-facing surface and a downwardly-facing surface which respectively engage the downwardly-facing and upwardly-facing surfaces of the conduit-supporting means and by their mutual engagements resist upward and downward movements of the conduit relative to the conduit-supporting means.

4. A heating or cooling air conduit structure for installation below the concrete floor slab and adjacent the foundation wall of a buliding, the said conduit structure comprising mutually connected top, bottom and side walls with one of the side walls having good thermal insulating properties and further comprising a separately-formed side-wall section possessing good thermal insulating properties to serve as an upward extension of the conduit side wall having such properties, and means for mechanically connecting the wall extension section to the last-mentioned conduit side wall in a position in which its projects upward substantially higher than the conduit top wall, whereby the conduit without the side-wall extension attached can be installed to serve as a radial feed conduit below a floor slab and, alternatively, with the side-wall extension attached can be installed adjacent a foundation wall circumscribing a floor slab and serve as a perimeter conduit and as thermal insulation between the conduit interior and the foundation wall and between the peripheral part of the floor slab and the foundation wall.

5. An air conduit structure as claimed in claim 4 in which the bottom wall and both of the side walls of the conduit have good thermal insulating properties.

6. An air conduit structure as claimed in claim 4 in which the thermally side wall of the conduit has its separately-formed upwardly-projecting section inclined laterally away from the mean plane of the other side wall of the conduit.

7. A heating or cooling air conduit structure for installation below the concrete floor slab of a building and adjacent the foundation wall thereof, the conduit structure comprising mutually connected top, bottom and side walls with one of the side walls possessing good thermal insulating properties and having its upper part projecting upward substantially higher than the top wall and at an inclination away from the mean plane of the other side wall.

References Cited in the file of this patent
UNITED STATES PATENTS

| Number | Name | Date |
|---|---|---|
| 506,311 | Fessenden | Oct. 10, 1893 |
| 732,152 | Appleman et al. | June 30, 1903 |
| 1,208,884 | Abbott | Dec. 19, 1916 |
| 1,764,629 | Houts et al. | June 17, 1930 |
| 1,833,509 | Wolf | Nov. 24, 1931 |
| 2,007,689 | Merrill | July 9, 1935 |
| 2,180,842 | Winding | Nov. 21, 1939 |
| 2,355,966 | Goff | Aug. 15, 1944 |
| 2,593,424 | Edgerly | Apr. 22, 1952 |
| 2,611,567 | Williamson | Sept. 23, 1952 |
| 2,726,593 | Lahti | Dec. 13, 1955 |
| 2,727,294 | Arrighini | Dec. 20, 1955 |

UNITED STATES PATENT OFFICE
CERTIFICATE OF CORRECTION

Patent No. 2,978,779

April 11, 1961

Richard Tatsch

It is hereby certified that error appears in the above numbered patent requiring correction and that the said Letters Patent should read as corrected below.

Column 5, line 33, for "3b"" read -- 3b' --; column 8, line 64, after "thermally" insert -- insulated --.

Signed and sealed this 21st day of November 1961.

(SEAL)
Attest:

ERNEST W. SWIDER
Attesting Officer

DAVID L. LADD
Commissioner of Patents

USCOMM-DC